United States Patent [19]

Gazalski

[11] Patent Number: 5,461,816
[45] Date of Patent: Oct. 31, 1995

[54] DECOY ANCHOR

[76] Inventor: Richard S. Gazalski, P.O. Box 1208, Henryetta, Okla. 74437

[21] Appl. No.: 213,524

[22] Filed: Mar. 16, 1994

[51] Int. Cl.⁶ ............................................. A01M 31/06
[52] U.S. Cl. ................................. 43/3; 441/24; 441/28
[58] Field of Search ............................ 43/3, 2; 441/23, 441/24, 25, 26, 27, 28

[56] References Cited

U.S. PATENT DOCUMENTS

| | | | |
|---|---|---|---|
| 814,097 | 3/1906 | Tartsch | 43/3 |
| 1,444,342 | 2/1923 | Godward | 43/3 |
| 2,630,093 | 3/1953 | Toal | 43/3 |
| 2,977,608 | 4/1961 | Brown | 441/24 |
| 3,704,538 | 12/1972 | Gagnon | 43/3 |
| 3,798,820 | 3/1974 | Dye | 43/3 |
| 3,834,054 | 9/1974 | Gentry | 43/3 |
| 4,539,772 | 9/1985 | Forbes | 43/3 |
| 5,172,507 | 12/1992 | Franceschini | 43/3 |

Primary Examiner—P. Austin Bradley
Assistant Examiner—James Miner
Attorney, Agent, or Firm—Shoemaker and Mattare, Ltd.

[57] ABSTRACT

A unitary structure which serves as a waterfowl decoy anchor having attached anchor line which structure is configured to be removably received for storage on the keel of a floatable waterfowl decoy.

1 Claim, 2 Drawing Sheets

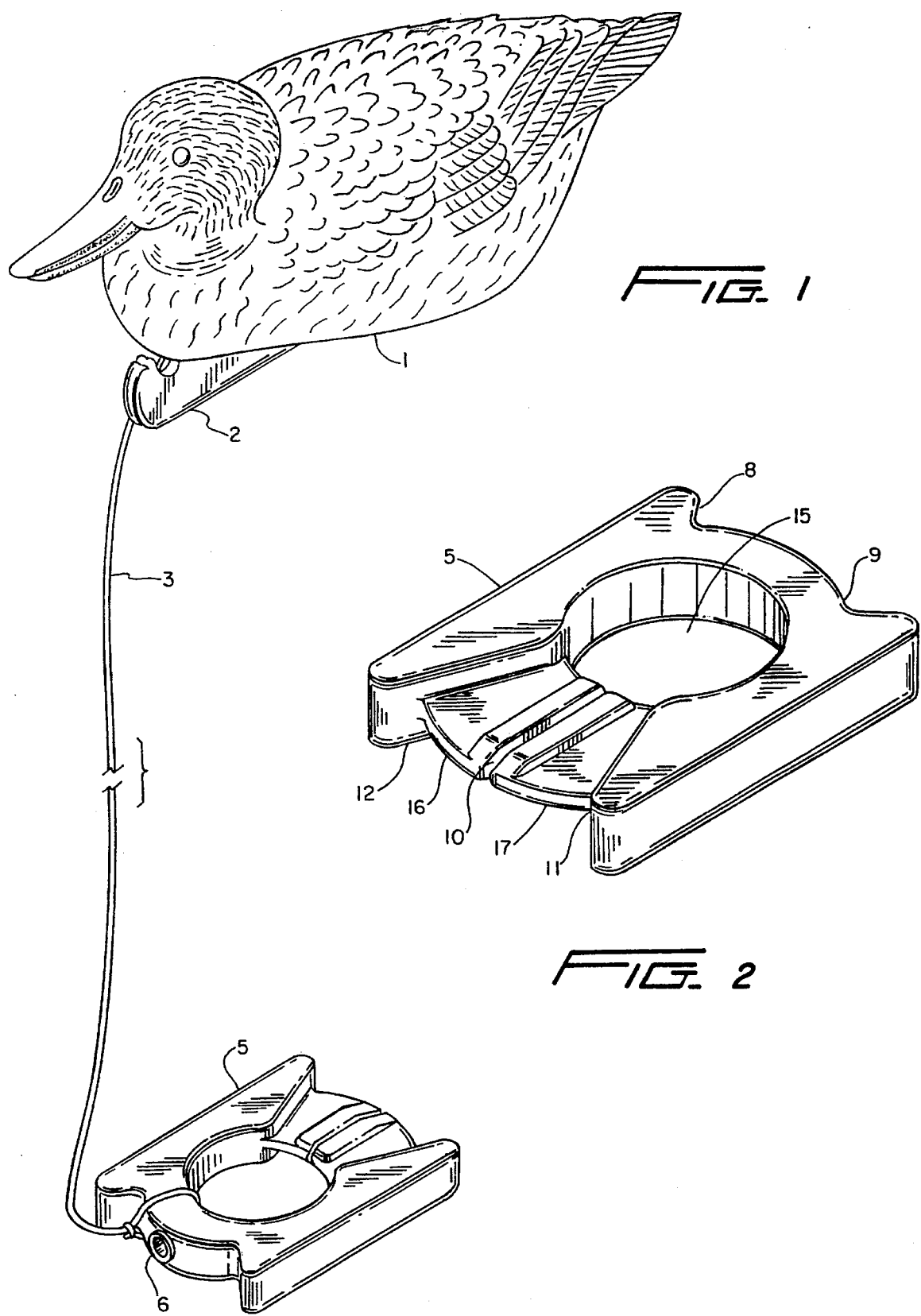

DECOY ANCHOR

FIELD OF THE INVENTION

This invention relates to waterfowl hunting and more particularly to waterfowl hunting over floating decoys and further relates to the manner in which the decoys are transported to and from a hunting site with the necessary decoy anchors attached.

BACKGROUND OF THE INVENTION

Waterfowl hunting over decoys, e.g., for ducks and geese, requires a considerable investment in decoys, decoy bags for carrying the decoys, anchors and line, all of which must be transported to the hunting site and set out or spread to simulate natural birds. This latter activity normally takes place in the evening before a hunt or predawn the day of hunting. The activity will often takes place in the dark aided merely by portable illumination, or car or truck head lights. It does not take a vivid imagination to understand the frustration that can accompany this activity and the time that can be consumed if the anchors and anchor lines have to be attached at the site, in the dark or untangled from other decoys and anchors and anchor lines all retrieved in a jumble from a decoy bag, in the dark. Also, the waterfowl seasons generally are late in the year so it is not only dark, but cold and dark. If the decoys are spread early in the day, any delay can be fatal to the hunt because mother nature's time schedule for ducks and geese to awake and begin moving will not wait for the hunter to untangle his decoys.

OBJECTS OF THE INVENTION

It is therefore an objective of the present invention to attempt to solve some of the foregoing problems by providing an anchor design and an anchor and decoy combination that keeps the decoy and anchor together in the decoy bag and the anchor line tidy, thereby reducing the possibility of tangles during bagging, storage, transportation and unloading the decoy bag at the hunting site.

BRIEF DESCRIPTION OF THE DRAWINGS

FIG. 1 is a perspective view of a floating waterfowl decoy and anchor attached as the invention would be in use;

FIG. 2 is a perspective view of the anchor of the present invention;

SUMMARY OF THE INVENTION

A floating waterfowl decoy anchor is provided as described herein that is designed to provide a convenient storage for its attached anchor line and to be removably received for storage on the keel of the floating decoy to provide a unitary combination for easy storage and transport to a hunting site and for ease of use when placing the decoy and anchor in the water for use.

DETAILED DESCRIPTION OF THE INVENTION

Referring to FIG. 1, a waterfowl decoy 1 is provided with a weighted keel 2, an anchor line 3, attached or affixed or tied to the keel 2 and to the anchor 5 as shown. The anchor 5 is of a hollow molded plastic single piece construction with a removable plug 6 provided to permit filling the interior of the anchor with shot, sand, or water and sand or any material or combination of materials having a specific gravity sufficiently above that of water itself to cause the anchor to sink to the bottom of the body of water being used as the hunting site. Sufficient anchor line is provided by the user for each decoy and anchor combination to reach the bottom and permit sufficient play or slack for realistic movement of the floating decoy on the top of the water caused by waves and wind.

Figure 3:
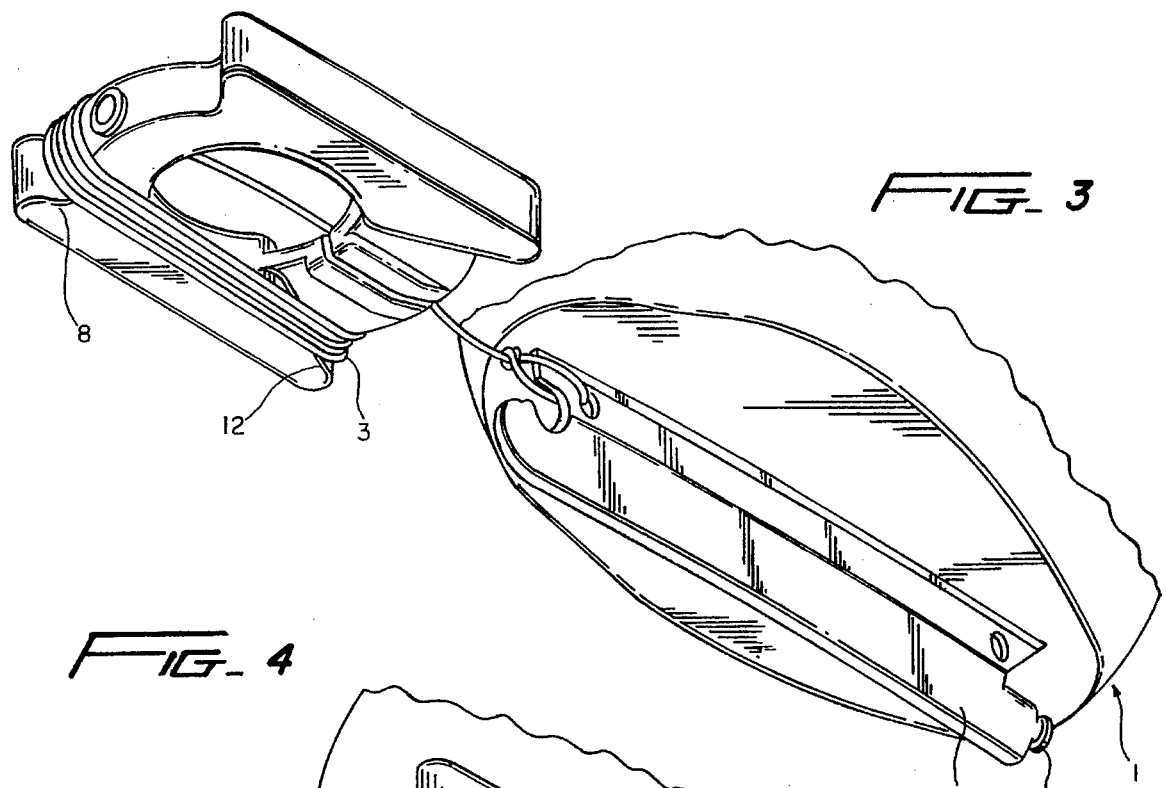
FIG. 3 is a perspective view of the anchor of FIG. 2 with anchor line attached to the anchor and the keel of the decoy, positioned to be received on the keel of the decoy.
Figure 4:
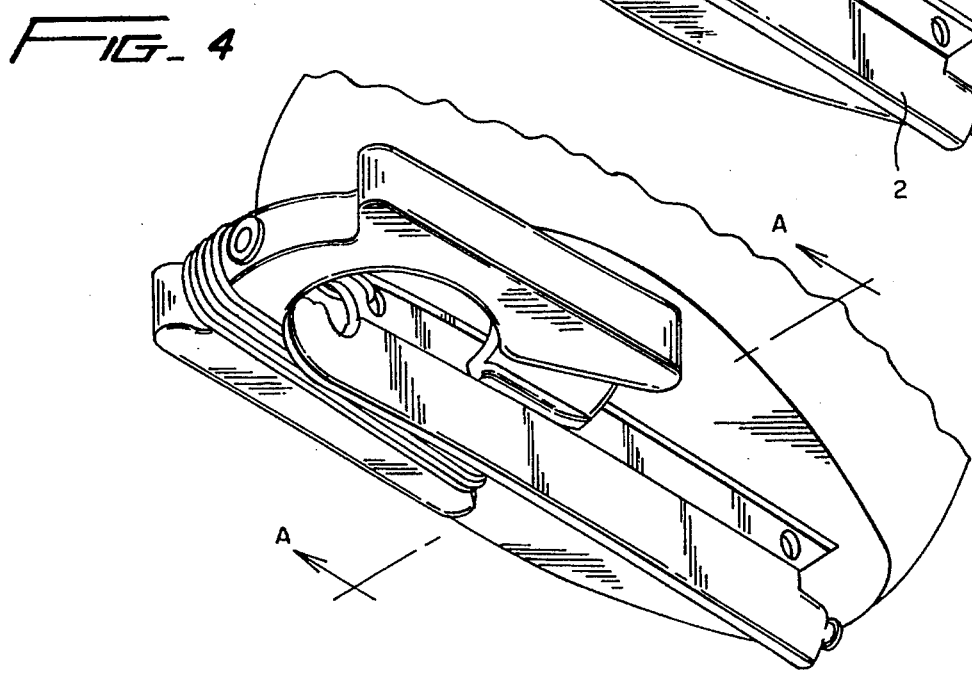
FIG. 4 is a bottom perspective view of the anchor, anchorline and decoy assembly of the present invention with the anchor received on the keel of the decoy and removably attached thereto while the anchor line is stored on the anchor.

Referring to FIG. 2, the anchor 5 is preferable of a generally rectangular shape provided with recesses 8, 9, 11 and 12 just inside the edges of the shortest dimension of the rectangle for receiving anchor line wrapping such as shown in FIG. 3. A slot 10 is provided which preferably is configured with sufficient wall thickness and a slot opening dimension to be removably received on the keel 2 as shown in FIG. 4. The anchor described herein is provided with an open area 15 for handling convenience however the slot 10 could be structured to extend as far as the opposite end of the opening 15 if desired. If should be apparent that the novel utility of the present invention resides in the gripping of the keel structure 2 by the walls 13 and 14 (FIG. 5) provided on both sides of the slot 10. Again it should be apparent that the dimensions selected can be different that those illustrated but sized consistent with the dimension of the web 20 on the keel 2 so that the anchor can fit snugly but removably on the keel 2 of the floating decoy. Different decoy designs may require different dimensions.

Figure 5:
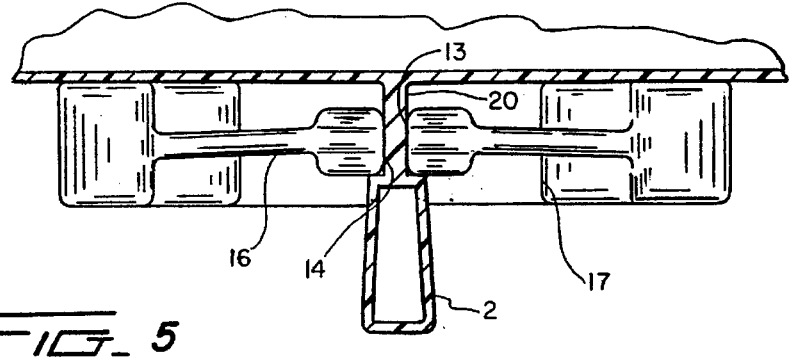
FIG. 5 is a partial cross-sectional view taken along the lines and arrows A—A of FIG. 4 showing the structure of the removable fastening means provided on the anchor.

In use, the anchor line 3 is attached to the anchor 5 and the keel 2, by tying or otherwise, keelweb 20 (FIG. 3) is shown with a hole 21 being provided for the tie point for the anchor line 3, keel 2 is also shown in FIG. 5 as being of a hollow construction, as is typical of some floating decoys. This hollow space has a plug 22 covering or inserted into a hole through which a material such as sand or shot has been added to provide stability for the decoy which itself is hollow, water tight and therefore buoyant. As previously described, the anchor itself is weighted and the plug 6 inserted. The anchor line 3 is wrapped around the anchor 5, as shown in FIG. 3 and the assembly slide along slot 10 onto the web 20 of the decoy. The unitary assembly, shown in FIG. 4 can then be stored and transported with other similar assemblies with a reduced risk of tangles and clutter.

The invention has been described and illustrated in it's presently preferred embodiment, i.e. as an anchor for a waterfowl decoy. It will be appreciated, however, that the slope, dimensions materials and other variables may be altered to suit individual design considerations without departing from the spirit and scope of the present invention which is best characterized by the illustrated and described gripping action of the walls 13 and 14 on the web 20 of the decoy. In the preferred embodiment the walls 13 and 14 have a gripping surface dimension greater than the thickness dimension of the web members 16 and 17 (FIGS. 2 and 5) in order to provide some flexure or flexibility so that the slot 10 does grip the keel web firmly. These same features can be advantageously employed in an anchor or weight used for other water sport activities, e.g. fishing, where the gripping action can be employed for storage and the like. The scope of the invention described and claimed should therefore only be limited by the appended claims viewed in light of the applicable prior art.

I claim:

1. A waterfowl decoy anchor adapted to be received on the support for the weighted keel of a floating waterfowl decoy consisting of a completely enclosed, elongated hollow body having a thickness dimension approximately the same as the weighted keel support of a waterfowl decoy; said elongated hollow body being generally rectangular in plan view and containing a longitudinal slot opening extending lengthwise of said anchor from the shortest dimension of said rectangular hollow body, said slot edges containing means for releasably engaging the keel support to thereby hold the anchor firmly to the keel support, said shortest dimensions of said elongated, rectangular hollow body containing recesses provided at locations to receive the wrapping of anchor line around the longest dimension of the anchor without interfering with the means for releasably engaging the keel support, and said anchor further containing a hole and removable plug means received in the hole for access to the interior of the elongated, hollow body to enable the interior of the hollow body to be provided with ballast for weighting the anchor to a sufficient weight for it to sink.

* * * * *